US008832080B2

(12) United States Patent
Zhang (10) Patent No.: US 8,832,080 B2
(45) Date of Patent: Sep. 9, 2014

(54) SYSTEM AND METHOD FOR DETERMINING DYNAMIC RELATIONS FROM IMAGES

(75) Inventor: Tong Zhang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 175 days.

(21) Appl. No.: 13/115,922

(22) Filed: May 25, 2011

(65) Prior Publication Data

US 2012/0303610 A1 Nov. 29, 2012

(51) Int. Cl.
*G06F 17/30* (2006.01)
(52) U.S. Cl.
USPC .......................................... 707/722; 707/723
(58) Field of Classification Search
CPC .................... G06F 17/30864; G06F 17/30867; G06F 17/30991
USPC ......... 382/118, 180, 164, 305, 293, 176, 282, 382/294, 181, 259, 302; 707/722, 723; 715/741, 781, 771, 805
See application file for complete search history.

(56) References Cited

U.S. PATENT DOCUMENTS

| | | | |
|---|---|---|---|
| 7,035,456 B2 | 4/2006 | Lestideau | |
| 7,564,994 B1 | 7/2009 | Steinberg et al. | |
| 7,831,069 B2 | 11/2010 | Shah et al. | |
| 8,041,082 B1 | 10/2011 | Baluja et al. | |
| 8,660,378 B2 | 2/2014 | Yabu et al. | |
| 2005/0165787 A1* | 7/2005 | Kaneda et al. | 707/10 |
| 2008/0162568 A1 | 7/2008 | Shen | |
| 2008/0298643 A1* | 12/2008 | Lawther et al. | 382/118 |
| 2009/0063557 A1* | 3/2009 | MacPherson | 707/103 R |
| 2009/0169062 A1 | 7/2009 | Cheung et al. | |
| 2009/0192967 A1 | 7/2009 | Luo et al. | |
| 2009/0281839 A1* | 11/2009 | Lynn et al. | 705/3 |
| 2009/0287630 A1 | 11/2009 | Kaiser | |
| 2010/0036875 A1* | 2/2010 | Miezianko et al. | 707/104.1 |
| 2010/0070505 A1* | 3/2010 | Kao et al. | 707/740 |
| 2010/0287213 A1* | 11/2010 | Rolls et al. | 707/803 |
| 2010/0312609 A1 | 12/2010 | Epshtein et al. | |
| 2011/0058028 A1 | 3/2011 | Sakai | |
| 2011/0142300 A1 | 6/2011 | Zhang et al. | |
| 2011/0317928 A1 | 12/2011 | Yabu et al. | |
| 2012/0106854 A1* | 5/2012 | Tang et al. | 382/224 |

OTHER PUBLICATIONS

Abigail Durrant; Photo Displays and Intergenerational Relationships in the Family Home HCI 2009—People and Computers XXIII Publication Date: 2009; pp. 10-19; (Research Paper).

(Continued)

*Primary Examiner* — Jeff A. Burke
*Assistant Examiner* — Thong Vu (57) ABSTRACT

A system and method are provided for determining a dynamic relation tree based on images in an image collection. An example system includes a memory for storing computer executable instructions, and a processing unit for accessing the memory and executing the computer executable instructions. The computer executable instructions include an event classifier to classify main characters of images in an image collection as to an event identification based on events in which the main characters appear, wherein each main character is characterized as to at least one attribute; a relation determination engine to determine relation circles of the main characters; and a construction engine to construct a dynamic relation tree representative of relations among the main characters, where the dynamic relation tree provides representations of the positions of the main characters in the relation circles, and where views of the dynamic relation tree change when different time periods are specified.

20 Claims, 8 Drawing Sheets

(56) References Cited

OTHER PUBLICATIONS

F. Gao, H. Ai, "Face age classification on consumer images with Gabor feature and fuzzy LDA method," Proc. of the 3rd IAPR International Conference on Biometrics, Jun. 2009.

F. Tang, D. Tretter, C. Willis, "Event classification for personal photo collections," IEEE Conf. on Acoustics, Speech, and Signal Processing, Prague, May 2011.

Gang Wang et al.; Seeing People in Social Context: Recognizing People and Social Relationships; University of Illinois at Urbana-Champaign, Kodak Research Laboratories (Research Paper).

P. Wu, D. Tretter, "Close & Closer: social cluster and closeness from photo collections," Proceedings of ACM Conf. on Multimedia, pp. 709-712, Beijing, Oct. 2009.

S. Golder, "Measuring social networks with digital photograph collections," Proc. of the 19th ACM Conf. on Hypertext and Hypermedia, pp. 43-47, Jun. 2008.

T. Zhang, J. Xiao, et al., "Face based image navigation and search," ACM Conf. on Multimedia, Oct. 2009.

W. Gao, H. Ai, "Face gender classification on consumer images in a multiethnic environment," Proc. of the 3rd IAPR International Conf. on Biometrics, Jun. 2009.

Gallagher et al. "Using Context to Recognize People in Consumer Images," IPSJ Trans. on Computer Vision and Applications 1, 2009, pp. 115-126.

Wu et al., "Interactive important social character identification from large photo collections," Visual Communications and Image Processing 2010, Jul. 2010, Proceedings of the SPIE, vol. 7744, article id. 77440B, 6 pp.

Cao et al., "Annotating Collections of Photos Using Hierarchical Event and Scene Models," IEEE Conference on Computer Vision and Pattern Recognition, 2008, CVPR 2008, pp. 1-8, <http://www.ifp.illinois.edu/~cao4/papers/caoGPSCVPR08.pdf>.

F. Tang, D. Tretter, C. Willis, "Event classification for personal photo collections," IEEE Conf. on Acoustics, Speech, and Signal Processing, Prague, May 22, 2011.

G. Guo, G. Mu, Y. Fu, T. Huang, "Human Age Estimation Using Bio-inspired Features," CVPR 2009, IEEE Conference on Computer Vision and Pattern Recognition, 2009.

Gang Wang et al., "Seeing People in Social Context: Recognizing People and Social Relationships," Computer Vision—ECCV 2010, Lecture Notes in Computer Science, vol. 6315, 2010, pp. 169-182.

HelpfulGeek, "Import Photos and Videos into Live Photo Gallery," Feb. 23, 2011, <http://web.archive.org/web/20110615054912/http://www.helpfulgeek.net/3/import-photos-and-videos-into-live-photo-gallery/>.

Imran et al., "Event recognition from photo collections via PageRank," MM '09, Proceedings of the 17th ACM international conference on Multimedia, 2009, pp. 621-624.

Junsong Yuan, "Mining Compositional Features From GPS and Visual Cues for Event Recognition in Photo Collections," IEEE Transactions on Multimedia, vol. 12, Iss. 7, Nov. 2010, pp. 705-716.

L. Gu, T. Zhang, X. Ding, "Clustering Consumer Photos Based on Face Recognition," Proc. of IEEE Conf. on Multimedia and Expo, pp. 1998-2001, Beijing, Jul. 2007.

Lin et al., "Joint People, Event, and Location Recognition in Personal Photo Collections Using Cross-Domain Context," Computer Vision—ECCV 2010, Lecture Notes in Computer Science, vol. 6311, 2010, pp. 243-256.

M. Das, "Event classification in personal image collections," IEEE International Conference on Multimedia and Expo, 2009, ICME 2009, pp. 1660-1663.

T. Zhang, H. Chao, et al. "Consumer image retrieval by estimating relation tree from family photo collections," ACM Conf. on Image and Video Retrieval, Jul. 2010.

Tang et al., "Event classification for personal photo collections," (presentation), IEEE Conf. on Acoustics, Speech, and Sianal Processing, May 22, 2011, <http://www.superlectures.com/icassp2011/downloadFile.php?id=170&type=slides&filename=event-classification-for-personal-photo-collections>.

Tong Zhang, "Building dynamic relation tree from photo collections," 2011 IEEE International Conference on Multimedia and Expo, ICME, Jul. 11, 2011, pp. 1-4.

Wu, "Close & Closer: Discover social relationship from photo collections," 2009, IEEE International Conference on Multimedia and Expo, 2009, pp. 1652-1655.

Yuan et al, "Mining GPS traces and visual words for event classification," MIR '08, Proceedings of the 1st ACM international conference on Multimedia information retrieval, 2008, pp. 2-9.

Zhang et al., "Consumer image retrieval by estimating relation tree from family photo collections," Proceedings of the 9th ACM International Conference on Image and Video Retrieval, CIVR 2010, Jul. 5-7, 2010.

Zhang et al., "Dynamic Estimation of Family Relations from Photos," Advance in Multimedia Modeling—17th International Multimedia Modeling Conference, MMM 2011, Jan. 5-7, 2011, Proceedings, Part II.

* cited by examiner

SYSTEM AND METHOD FOR DETERMINING DYNAMIC RELATIONS FROM IMAGES

BACKGROUND

With the advent of digital cameras and advance in massive storage technologies, people now have the ability to capture many casual images. It is not uncommon to find tens of thousands, if not hundreds of thousands of images taken over a number of years in a personal computer or database. The many images captured of individuals, whether alone or in group, can be used to provide useful information. A tool that facilitates determination of a dynamic relation tree based on images in the image collection would be beneficial.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

An "image" broadly refers to any type of visually perceptible content that may be rendered on a physical medium (e.g., a display monitor or a print medium). Images may be complete or partial versions of any type of digital or electronic image, including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image (e.g., a bitmap image containing text); and an iconographic image.

A "computer" is any machine, device, or apparatus that processes data according to computer-readable instructions that are stored on a computer-readable medium either temporarily or permanently. A "software application" (also referred to as software, an application, computer software, a computer application, a program, and a computer program) is a set of machine-readable instructions that a computer can interpret and execute to perform one or more specific tasks. A "data file" is a block of information that durably stores data for use by a software application.

The term "computer-readable medium" refers to any medium capable storing information that is readable by a machine (e.g., a computer system). Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

As used herein, the term "includes" means includes but not limited to, the term "including" means including but not limited to. The term "based on" means based at least in part on.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one example, but not necessarily in other examples. The various instances of the phrase "in one embodiment" or similar phrases in various places in the specification are not necessarily all referring to the same embodiment.

Identifying significant people and their relations in an image collection can provides useful semantic information that may be used in many applications, including image management, personalized advertisement, social networking, and homeland security.

Described herein are novel systems and methods for determining a dynamic relation tree based on images in an image collection. An example system includes a memory for storing computer executable instructions and a processing unit for accessing the memory and executing the computer executable instructions. The computer executable instructions includes an event classifier to classify main characters of images in an image collection as to an event identification based on events in which the main characters appear, where each image has a time stamp, and where each main character is characterized as to at least one attribute. The system includes a relation determination engine to determine relation circles of the main characters based on the event identifications, and a construction engine to construct a dynamic relation tree representative of relations among the main characters. The dynamic relation tree provides representations of the positions of the main characters in the relation circles. The views and constituents of the dynamic relation tree change when different time periods are specified during display.

In an example system and method herein, images are grouped into events based on time-based clustering, wherein the images comprise relationship information. The main characters of the images are classified as to an event identification based on events in which they appear. The relation circles of the main characters are determined based on the event identifications. A dynamic relation tree representative of relations among the main characters is constructed. The dynamic relation tree provides representations of the positions of the main characters in the relation circles. The representations and constituents of the dynamic relation tree change when different time periods are specified during display.

In a non-limiting example, the dynamic relation tree includes time information for estimating the relations between main characters so that people's relations can be estimated more accurately. The views of a dynamic relation tree can be configured to change with the selection of time range, and thus can reveal more information than a static relation tree. For example, views of the dynamic relation tree can be used to show people's relations as they change over time.

In an example system and method herein, an automated workflow can be created that derives a relation tree for main characters in an image collection by integrating technologies for face clustering and facial feature analysis, together with contextual information. Since people's relations may evolve over time, for image collections spanning a period of time (e.g., a number of years), the dynamic relation tree is constructed to visually represent people's relations.

In an example system and method herein, a workflow is provided that automatically estimates a relation tree from a collection of images. For example, a family relation tree can be derived from a collection of family photos. The dynamic relation trees herein can provide more accurate estimation of the relations of individuals. The dynamic relation trees herein can be used to provide more details of people's relations. The dynamic relation tree also can provide a life-log to remind people of events and changes in their lives with glance views.

In another example, an example system and method are provided for an automated workflow for deriving family relations and social circles from image collections. The system and method integrates results from face clustering and face analysis technologies, together with people co-occurrence and position information using learning algorithms and heuristic rules, to construct the dynamic relation tree. Views of the dynamic relation tree are created based on timestamps and event detection to show the evolution of people's life and relations.

Figure 1A:
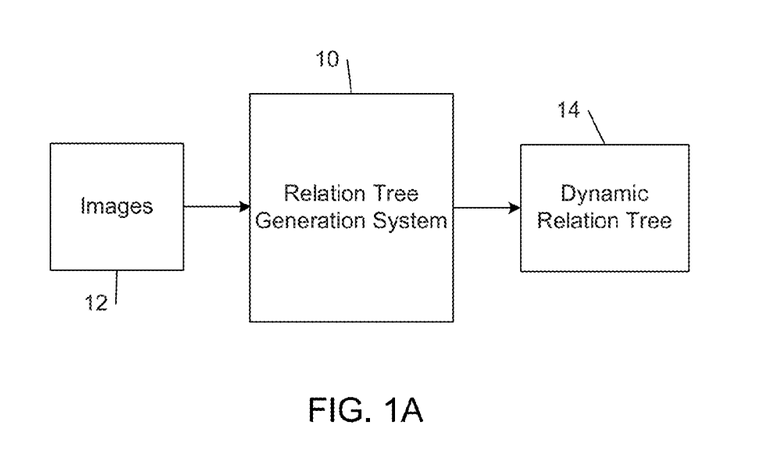
FIG. 1A is a block diagram of an example of a relation tree generation system for constructing a dynamic relation tree based on images.

FIG. 1A shows an example of a relation tree generation system 10 that determines a dynamic relation tree 14 using images from image collection 12 (which includes images of the individual). The relation tree generation system 10 receives image data representative of image collection 12, and, according to example methods described herein, determines a dynamic relation tree 14 using images from image collection 12. The input to the relation tree generation system 10 also can be several collections of images that include images of the individual.

An example source of images is personal photos of a consumer taken of family members and/or friends. As non-limiting examples, the images can be photos taken during an event, including, a wedding, a christening, a birthday party, a holiday celebration (such as but not limited to Christmas, Memorial Day, Independence Day, July 4, Easter, etc), a vacation, or any other occasion. Another example source is images of an event captured by an image sensor of, e.g., entertainment or sports celebrities, or reality television individuals. The images can be taken of one or more members of a family at an event, such as but not limited to an attraction at an amusement park. In an example use scenario, a system and method disclosed herein is applied to images in a database of images captured at events, such as but not limited to images captured using imaging devices (such as but not limited to surveillance devices, or film footage) of an area located at an airport, a stadium, a restaurant, a mall, outside an office building or residence, etc. In various examples, each image collection can be located in a separate folder in a database, or distributed over several folders. The image collection also may be distributed over multiple locations, such as but not limited to, over multiple machines, over multiple servers (including servers in the cloud), over multiple websites, etc. it will be appreciated that other sources are possible.

Figure 1B:
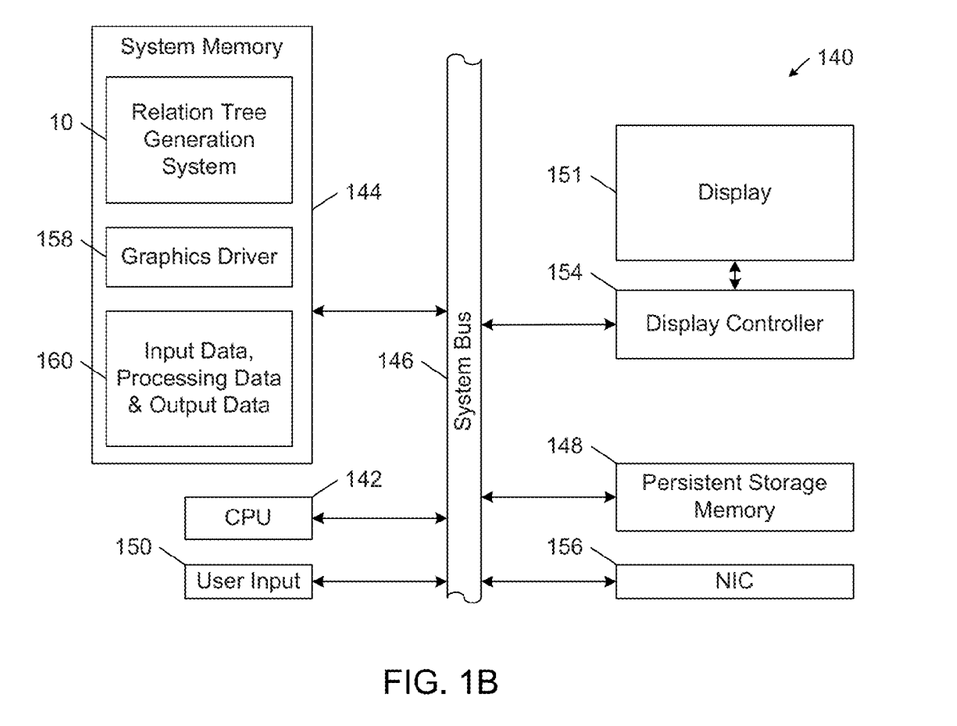
FIG. 1B is a block diagram of an example of a computer system that incorporates an example of the relation tree generation system of FIG. 1A.

FIG. 1B shows an example of a computer system 140 that can implement any of the examples of the relation tree generation system 10 that are described herein. The computer system 140 includes a processing unit 142 (CPU), a system memory 144, and a system bus 146 that couples processing unit 142 to the various components of the computer system 140. The processing unit 142 typically includes one or more processors, each of which may be in the form of any one of various commercially available processors. The system memory 144 typically includes a read only memory (ROM) that stores a basic input/output system (BIOS) that contains start-up routines for the computer system 140 and a random access memory (RAM). The system bus 146 may be a memory bus, a peripheral bus or a local bus, and may be compatible with any of a variety of bus protocols, including PCI, VESA, Microchannel, ISA, and EISA. The computer system 140 also includes a persistent storage memory 148 (e.g., a hard drive, a floppy drive, a CD ROM drive, magnetic tape drives, flash memory devices, and digital video disks) that is connected to the system bus 146 and contains one or more computer-readable media disks that provide non-volatile or persistent storage for data, data structures and computer-executable instructions.

A user may interact (e.g., enter commands or data) with the computer system 140 using one or more input devices 150 (e.g., a keyboard, a computer mouse, a microphone, joystick, touch screen, and touch pad). Information may be presented through a user interface that is displayed to a user on the display 151 (implemented by, e.g., a display monitor), which is controlled by a display controller 154 (implemented by, e.g., a video graphics card). The computer system 140 also typically includes peripheral output devices, such as speakers and a printer. One or more remote computers may be connected to the computer system 140 through a network interface card (NIC) 156.

As shown in FIG. 1B, the system memory 144 also stores the relation tree generation system 10, a graphics driver 158, and processing information 160 that includes input data, processing data, and output data. In some examples, the relation tree generation system 10 interfaces with the graphics driver 158 to present a user interface on the display 151 for managing and controlling the operation of the relation tree generation system 10.

The relation tree generation system 10 can include discrete data processing components, each of which may be in the form of any one of various commercially available data processing chips. In some implementations, the relation tree generation system 10 is embedded in the hardware of any one of a wide variety of digital and analog computer devices, including desktop, workstation, and server computers. In some examples, the relation tree generation system 10 executes process instructions (e.g., machine-readable instructions, such as but not limited to computer software and firmware) in the process of implementing the methods that are described herein. These process instructions, as well as the data generated in the course of theft execution, are stored in one or more computer-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

The principles set forth in the herein extend equally to any alternative configuration in which relation tree generation system 10 has access to image collection 12. As such, alternative examples within the scope of the principles of the present specification include examples in which the relation tree generation system 10 is implemented by the same computer system, examples in which the functionality of the relation tree generation system 10 is implemented by a multiple interconnected computers (e.g., a server in a data center and a user's client machine), examples in which the relation tree generation system 10 communicates with portions of computer system 140 directly through a bus without intermediary network devices, and examples in which the relation tree generation system 10 has stored local copies of image collection 12.

Figure 2:
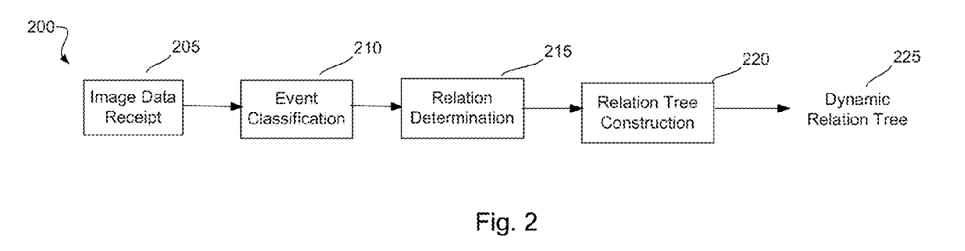
FIG. 2 is a block diagram of an example functionality implemented by an illustrative computerized relation tree generation system.

Referring now to FIG. 2, a block diagram is shown of an illustrative functionality 200 implemented by relation tree generation system 10 for determining a dynamic relation tree based on images, consistent with the principles described herein. Each module in the diagram represents an element of functionality performed by the processing unit 142. Arrows between the modules represent the communication and interoperability among the modules. In brief, image data representative of images in an image collection is received in block 205. Event classification of the images is performed in block 210 based on the image data. Relation determination is performed in block 215, and relation tree construction is performed in bock 220 to provide the dynamic relation tree 225.

Referring to block 205, image data representative of images in an image collection is received. The image data can include metadata connected with an image, such as but not limited to a time stamp that indicates when the image was captured. In an example, image data includes pixel values of the image. The image data can be data indicative of face regions of individuals in the images.

Referring to block 210, to classify images as to an event, event classification is performed by a module based on the image data. In an example, the event classification is performed by a module on image data resulting from the operation of a face detector on the images of the image collection. In an example, an event classifier is applied to classify main characters of images in an image collection as to an event identification, based on events in which the main characters appear, where each image has a time stamp. Each main character is characterized as to at least one attribute.

Figure 3:
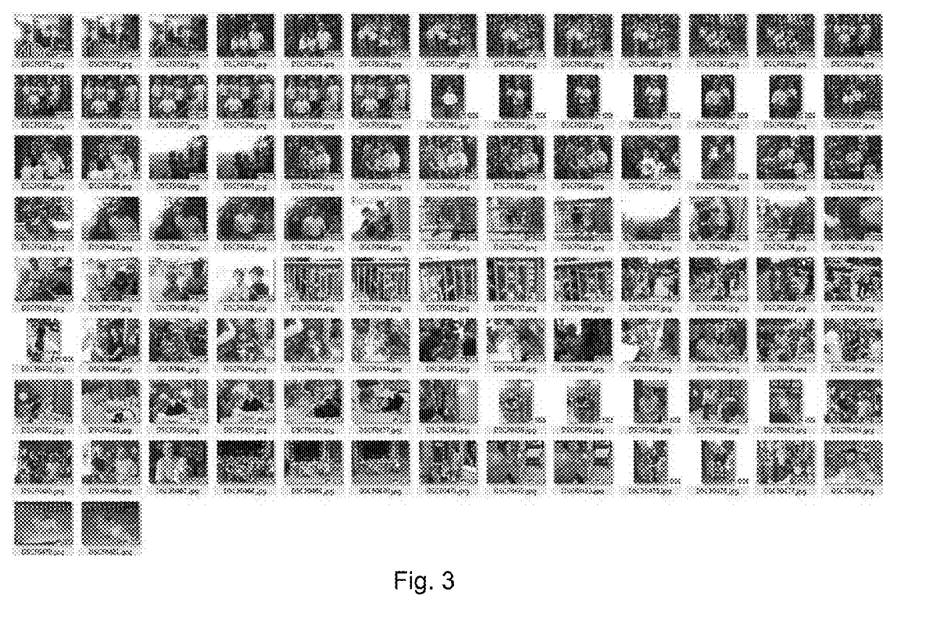
FIG. 3 is an example image collection.

In an example, a face detector is applied to locate the main characters in the images based on image data. Face detection is applied to detect at least one face region in the images, for example, using a face detection algorithm. The face detection can be performed on the image forming elements of the images. Face detection can be performed by the same module that applies the event classification or by a different module. In an example, all images in the image collection are processed in order to detect faces. In another example, it may be desirable to limit the face detection to only some of the images in the collection, particularly if the image collection is very large. FIG. 3 shows examples of images from an image collection to which a face detector can be applied to identify the main characters.

Face clustering can be applied to group the detected faces into respective clusters representing a sub-set of images from the image collection. The detected faces, represented as image data representative of a face, can be clustered into sub-sets that include images having at least one face in common. Non-limiting examples of applicable clustering analysis include a hierarchical clustering analysis, such as an agglomerative hierarchical clustering, or a partitional clustering analysis, such as k-means clustering, fuzzy c-means clustering, or quality threshold (QT) clustering. In an example, an unsupervised machine learning tool is applied for clustering the image collection. A result of the image clustering is the identification of image dusters. The common face is the person who is considered the subject of the image cluster. The common face of an image duster can be a main character. Accordingly, multiple dusters may contain a proportion of images that are the same, but that have several people therein such that different people are the subject of the respective dusters. According to an example, major face dusters are defined that include sub-sets of images from the collection in which the face of the main characters appear as the common face. An image cluster in which a main character appears in a large number of images can be classified as a major cluster. The number required to classify an image cluster as a major cluster can be a predetermined number (e.g., a number between 5 and 10), or it can be a proportion of the number of images in the collection (such as 10% for example), or can be determined in response to the number of dusters that have been determined. For example, the largest 10% of determined image dusters can be classified as major dusters that is to say, major dusters can be defined as those which are the largest sub-sets of images from those generated. It will be appreciated that other ways of categorizing the sub-sets can be used, and the above is not intended to be limiting. In an example, all sub-sets may be classified as major dusters. With the face clustering technology, images of the main characters can be automatically collected.

Each main character can be characterized as to at least one attribute. The characterization of a main character as to at least one attribute can be performed by the same module that applies the event classification or by a different module. Examples of attributes include gender, age group, a face similarity measure, co-appearances, and relative positions information. In an example, demographic assessment can be performed on each face duster to determine the gender and age group of each main character. For example, age estimation can be performed to classify the individual as a baby, a child, a youth, an adult, a senior, or other age-based classification. In an example, a face similarity measure is used to find people who look alike, which can serve as a due to the identity of blood relatives. The face similarity measure can be computed between pairs of image dusters based on the main character's face, and can be used to identify people who look alike and can serve as a due to identify blood relatives. In an example, people's co-appearances and relative positions in the images are extracted to derive closeness among people. For example, people who co-appear a lot in images can be determined as dose to each other. Levels of intimacy also can be determined. People's positions in images also can be an indication of closeness. For example, face-touching positions can appear between intimate people such as couple, lovers, parent-child, grandparent-grandchild, and siblings.

An example system and method for characterizing a main character is described in U.S. patent application Ser. No. 12/637,977, titled "Estimating Relation Tree From Image Collections Based On Face Analysis," filed Dec. 15, 2009, which is incorporated by reference in its entirety, including drawings.

A non-limiting example of the results of implementation of the characterization of main characters is as follows. Example collections of family images are used. The family structure includes husband, wife and children, extended family members, relatives and friends. Each image collection dataset includes 1000 to 3000 images that span 7 to 9 years. A workflow is applied to estimate relations. Table 1 shows the major face dusters obtained from an image collection with face clustering and the demographic estimation results on each cluster. There are 28 major clusters (numbered 1 to 28), sorted by the cluster size. The common face in a major face cluster can be determined as a main character. Demographic analysis is performed on the cluster level, which aggregates results from each face in a major cluster. The accuracy can be higher than on the individual face level. The error in estimation of the gender can be reduced if the image cluster is larger.

TABLE 1

Major face clusters resulting from an example family image collection

| Cluster No. | 1 | 2 | 3 | 4 | 5 | 6 | 7 | 8 | 9 |
|---|---|---|---|---|---|---|---|---|---|
| Cluster size | 447 | 274 | 254 | 224 | 92 | 74 | 69 | 65 | 58 |
| Est. age | C | C | A | A | C | A | S | S | S |
| Est. gender | F | F | F | M | M | F | M | M | F |
| Cluster No. | 10 | 11 | 12 | 13 | 14 | 15 | 16 | 17 | 18 |
| Cluster size | 43 | 34 | 30 | 18 | 18 | 11 | 9 | 9 | 9 |
| Est. age | S | A | S | A | C | C | A | A | A |
| Est. gender | M | F | F | M | M | M | M | M | F |
| Cluster No. | 19 | 20 | 21 | 22 | 23 | 24 | 25 | 26 | 27 | 28 |
| Cluster size | 9 | 8 | 8 | 8 | 8 | 7 | 7 | 7 | 6 | 5 |
| Est. age | S | S | S | A | S | S | A | A | S | A |
| Est. gender | F | F | F | F | F | F | F | F | F | F |

(C—Child; A—Adult; S—Senior; M—Male; F—Female)

Event classification can be performed as follows. Images of the main characters are divided down into events according to time-based clustering. The time-based clustering can be performed based on the time stamp of the images. Each time cluster from the time-based clustering can be centered around the date of an event. Each time cluster may correspond to a fixed time, and include images pertaining to an event. As non-limiting examples, an event may be a party within one day, or a Christmas vacation spanning multiple days. The event detection can be based on images captured in burst mode or in an even mode in which the time distance between consecutively taken images follows a certain distribution. In a non-limiting example, the time intervals between consecutive images can be sorted, from large to small, and the Ath and the Bth percentile values (A>B) can be identified. A threshold can be computed according to the following expression:

$$\text{Ath percentile value} + \alpha \times (\text{Ath} - \text{Bth})\text{percentile value} \quad (1)$$

where A, B and α are values. The values of A, B and α can be empirically determined. According to this example, images are broken down into events at intervals larger than the threshold, and each event is assigned an event identification.

Figure 4:
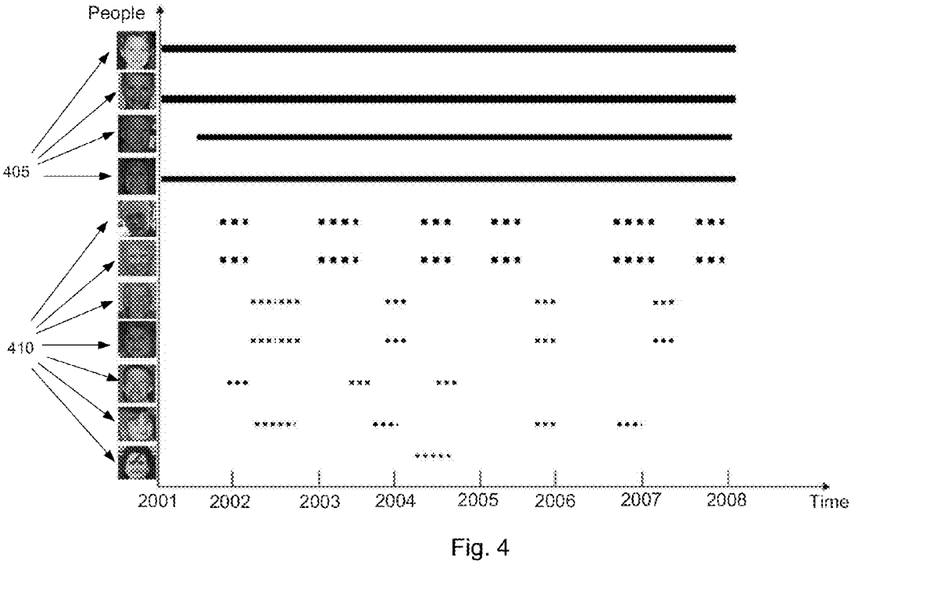
FIG. 4 shows an example event-people graph.

Each main character is labeled with the event identification for each event in which he or she appears. Based on the event classification, an event-people graph can be generated. FIG. 4 shows a non-limiting example of an event-people graph. In the graph, the x-axis shows the time of events, and the y-axis shows the main characters identified in the images of the image collection. In FIG. 4, each dot indicates an event a main character is labeled with, and a line indicates that a main character appears in all events across the time span of the line. For example, main characters 405 appear in all events across the time span from about 2002 to 2008 (by the line), and main characters 410 appear in select events between about 2002 and 2008 (as indicated by the dots). The example event-people graph of FIG. 4 shows the main characters that appear in which events along the years. In another example, an event-people graph can be generated to show all main characters on the year level, or month level, or event level depending on what length of time the image collection spans.

In the event-people graph, time clustering along the y-axis at any fixed time can be used to show people who appear together in a certain event. The type of an event can be estimated by its length, such as but not limited to a party, a day-trip, a multi-day trip, a multi-day vacation, or a casual image capture, and the time associated with the event, including Valentine's Day, July 4th, Halloween, Thanksgiving, and Christmas. Identification of event-related objects in an image also can be used to identify the event classification, including a baseball game, a kids' party, and a wedding.

The event-people graph may be displayed on an interactive interface so that it can accept user commands. For example, the interactive interface may allow a user to select which main character to show on the event-people graph, and to zoom-in or zoom-out to control the time granularity of the display. In an example event-people graph, the density or thickness of lines may show how much a person appears in one event. A graphing engine can be used to generate the event-people graph. The event-people graph can be displayed to a user.

Based on the results of block 210, relation determination is performed in block 215. In an example, a relation determination engine is applied to determine relation circles of the main characters based on the event identifications. An estimation of people's relations is refined and social circles are determined. The relation circles can include the soda circles in an example.

The relation determination engine can be used to identify, as non-limiting examples, multiple people with over-lapping roles but non-overlapping in time. In an example, multiple spouses through different marriages at different times can be identified. A single person with multiple roles can be determined. The relation determination engine also can be used to identify people associated with events in life including childbirth, the passing away of family members, couples getting together, or breaking up. With the event identifications determined in block 210, social circles involved in the image collection can be identified. The nature and closeness of social circles such as but not limited to relatives, soccer team, colleagues, or classmates, may be estimated.

The main characters who are members of the same social circle can be identified. The image time stamps can provide semantic information. For instance, main characters who tend to appear in the same event may be determined as belonging to the same social circle. Family relations, including nuclear family, extended family, and other relatives or friends, can be determined.

Identification of members of a nuclear family is described. From all major image clusters, which can be defined as clusters including more than M images (e.g., M=4 or 5 or more), the main characters of larger clusters are first selected as candidates for members in the nuclear family including husband, wife and theft kids. In an example, the members of the nuclear family can be determined using a mixture model and associated algorithm, such as but not limited to a Gaussian mixture model (GMM), applied on the kid's clusters (baby, child, junior) and on adult clusters (adult, senior), respectively. Next, among these candidates, a link can be determined between each pair of people based on the number of co-occurrences, and with weights added to cases including exclusive images (i.e., not images with groups of people), closeness of positions of main characters in images with groups of people, face-touching positions, and baby-holding positions. In this example, main characters that are members of a nuclear family appear as those having strong links with one another.

Identification of members of the extended family can be determined as follows. Main characters that are parents and siblings of the husband or wife, as well as siblings' families can be determined as extended family members. They can be identified through facial similarity, co-appearances and positions in images. Main characters that are senior and that have high facial similarity with a husband or wife, and strong links with members of the nuclear family can be identified. The main characters that are senior and appear as a couple can be further identified as the parents of the husband or the wife according to the link between them and theft links with the husband or wife. A sibling of the husband or wife may have strong link not only with the husband or wife, but also with the corresponding parents in facial similarity and co-appearances. The sibling also may have co-occurrences with the children in the nuclear family, with intimate positions. A sibling's family can be identified as those who have strong links with the sibling, as well as co-appearances with nuclear family members and the corresponding parents.

Identification of main characters that are other relatives or friends can be determined as follows. People can be identified as relatives if they co-appear not only with the nuclear family, but also with the extended family members in a large amount of images or in different events. The remainder of the main characters can be determined as friend.

With the results of the operation in block 220, relation tree construction is performed in block 220 of FIG. 2 to provide a dynamic relation tree 225. The dynamic relation tree can be built with an interactive display supported according to a system and method described herein. A construction engine can be used to construct a dynamic relation tree that is representative of relations among the main characters. The dynamic relation tree can provide representations of the positions of the main characters in the relation circles. In an example of the relation tree, the dynamic relation tree can be displayed using an interactive interface so that the views and constituents of the dynamic relation tree change when different time periods are specified during the display. The interactive interface may provide a timeline, and a feature that allows a user to choose to zoom-in or zoom-out of a view of the dynamic relation tree based on the timeline. The interactive interface may provide a feature that allows a user to zoom in to the display of the dynamic relation tree to see main characters associated with specific events in certain years. In an example, the interactive interface provides a selective zoom feature that allows a user to select views of the dynamic relation tree that display images associated with certain branches of the dynamic relation tree. In an example, the interactive interface provides a selective time feature that allows a user to select views of the dynamic relation tree that display images of the dynamic relation tree associated with a specified time period.

A dynamic relation tree can be built that places the main characters in theft corresponding positions in the relation circles. The view of the dynamic relation tree can change when different time periods are specified. The dynamic relation tree is constructed using the identification of the main characters and theft relations from the analysis of the images in the image collection. However, each view of the dynamic relation tree may include only those main characters that appear in the specified time period of the display, such as but not limited to a certain year or a certain event. In an example, the dynamic relation tree can be used to show the evolution of relations among main characters over time. For example, a series of views of the dynamic relation tree can be used to reveal the evolution of relations over time. In an example, the dynamic relation tree can be used to provide a type of life-log with dance views that can be used to remind a user of events and people involved in the events. In an example, the dynamic relation tree can be constructed based on additional heuristic rules. For example, it can be constructed based on an assumption that blood relation estimation is more reliable than significant-other relation estimation.

A non-limiting example implementation of a dynamic relation tree is described. Example displays of views of a dynamic relation tree that can be displayed using an interactive interface are shown in FIGS. 5A to 5F. The views of FIGS. 5A to 5F show are of a dynamic relation tree of an example image collection including family photos spanning 7 years, from 2001 to 2008. The event classification of the images is performed as described in block 210, relation determination is performed as described in block 215. The interactive interface can also be configured to display views showing main characters over different tune spans or at different events.

The relations of the main characters can be depicted in the views of the dynamic relation tree on the interactive interface. In each of the example displays of FIGS. 5A to 5F, the nuclear family members are placed in the center within the solid circle, with the parents (husband and wife) on the upper row and the children on the second row. The extended family members are positioned around the nuclear family within the dashed circle. The parents of the husband and wife, and where available the grandparents of the husband and wife, are positioned one level higher. The siblings and their families are put at about the same level as the nuclear family. Main characters associated with the husband are positioned next to him, and main characters associated with the wife are positioned next to her. Outside the dashed circle are other relatives and friends of the family. A dotted circle indicates either another family (that includes husband, wife and children), or a group of main character who tend to appear together. An arrow shows to what main character in the nuclear family a person or group of people is connected. It may be a single main character in the family or the entire nuclear family.

The displays of branches of the dynamic relation tree provide information on the evolution of relationships of the main characters. For example, the grandparents on both the husband's and wife's side appear together in images with the nuclear family each year except that the wife's parents did not appear in 2006. The nuclear family members appear with the great-grandmother in 2003. In that same year, the husband's sister appears in images with members of the nuclear family. The daughter's favorite teacher, a friend of the family, appears in images in 2004. Two neighbor families, classified as friends, appear in almost every year and the children appear with them several times.

In an example interactive interface, a feature may be included that allows a user to select to zoom-in or zoom-out of a dynamic relation tree view. For example, in the dynamic relation tree of FIGS. 5A to 5F, if a user instructs a command for the interactive interface to display a zoom into specific events in certain years, more details of the dynamic relations may be displayed. For example, a zoom level display in 2004 (such as that of FIG. 5C) indicates that the wife's parents appear in images together with members of the nuclear family during the event of Thanksgiving in 2004, and the husband's parents appear in images at Christmas with members of the nuclear family. The interactive interface can also be configured to display views showing how the physical features of main characters have evolved over time. For example, the interactive interface can be configured to show how the appearance of children changes when they grow from pre-schoolers to early teenagers. In an example, the interactive interface can be used to display views of the dynamic relation tree that present details about the activities and changes in the main characters and their relations.

Figure 5A:
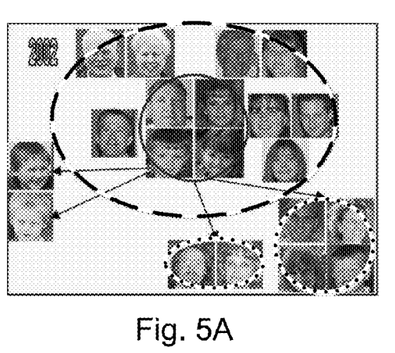
FIGS. 5A-5F show example views of a dynamic relation tree.
Figure 5B:
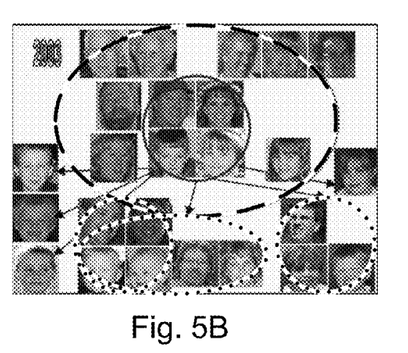
Figure 5C:
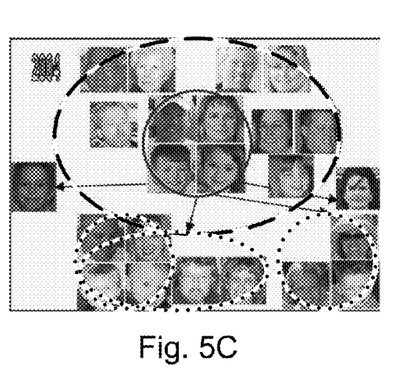
Figure 5D:
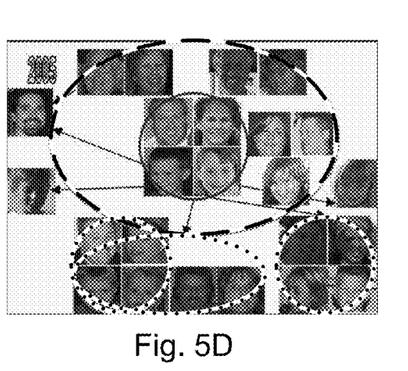
Figure 5E:
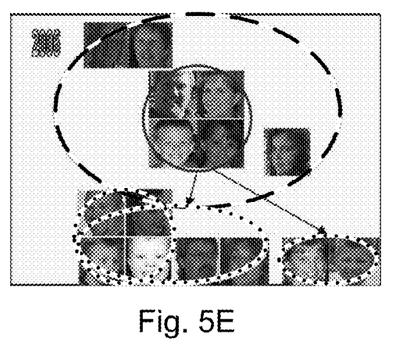
Figure 5F:
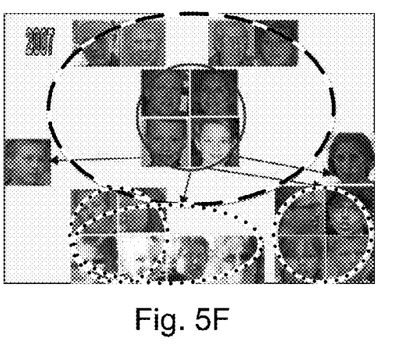
Figure 6A:
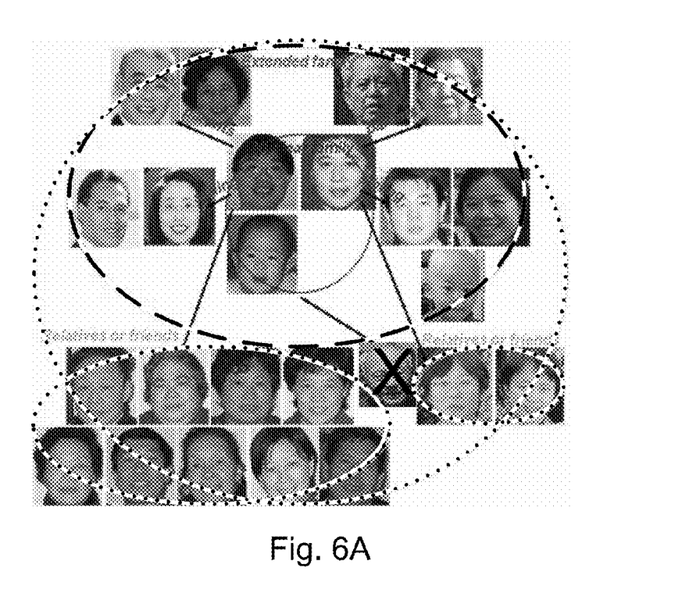
FIGS. 6A and 6B show example views of a dynamic relation tree.
Figure 6B:
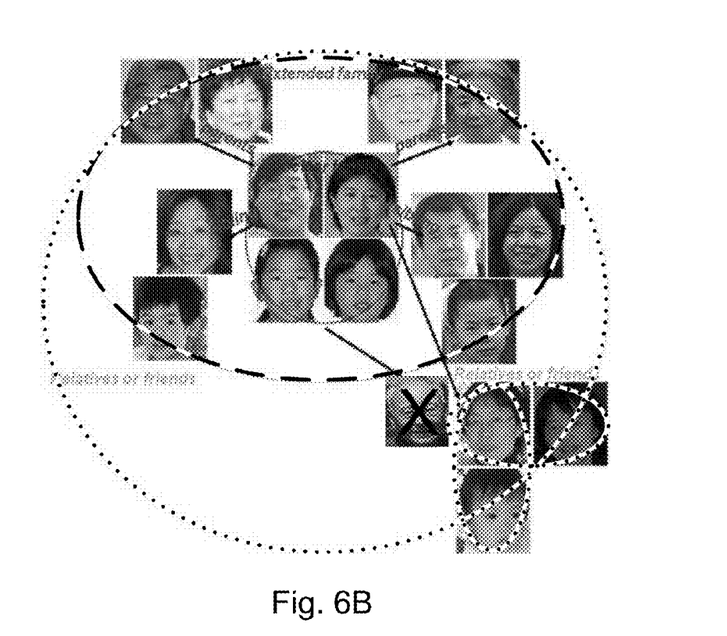

FIGS. 6A and 6B show two views of the dynamic relation tree constructed from another image collection (another dataset), one for the year 2003 and one for the year 2009. In this example, the nuclear family members are placed in the center within a solid circle, with the parents (husband and wife) on the upper row and the children on the second row. The extended family members are positioned around the nuclear family within the dashed circle. The parents of the husband and wife are positioned one level higher. The siblings and theft families are put at about the same level as the nuclear family. Main characters associated with the husband are positioned next to him, and main characters associated with the wife are positioned next to her. Outside the dashed circle are other relatives and friends of the family. A dotted circle indicates either another family (that includes husband, wife and children), or a group of main characters who tend to appear together. An arrow shows to what main character in the nuclear family a person or group of people is connected. In the example of FIGS. 5A and 6B, a senior man is positioned dose to two senior women based on the determined relations. One of the senior women is his late wife, and the other is his current wife. Both senior women have strong links with the nuclear family. However, since the two women do not appear in images that have any overlap in time, theft relationship to the senior man can be determined from their placement in the dynamic relation tree. The views of FIGS. 5A and 6B also show a man, marked with an "X", who appears in error since he is not related to any of the main characters nor is a friend of any main characters. The dynamic relation tree allows determination that the man appears in error, since he appears in some images taken by the family on a vacation trip, and in no other images.

Figure 7:
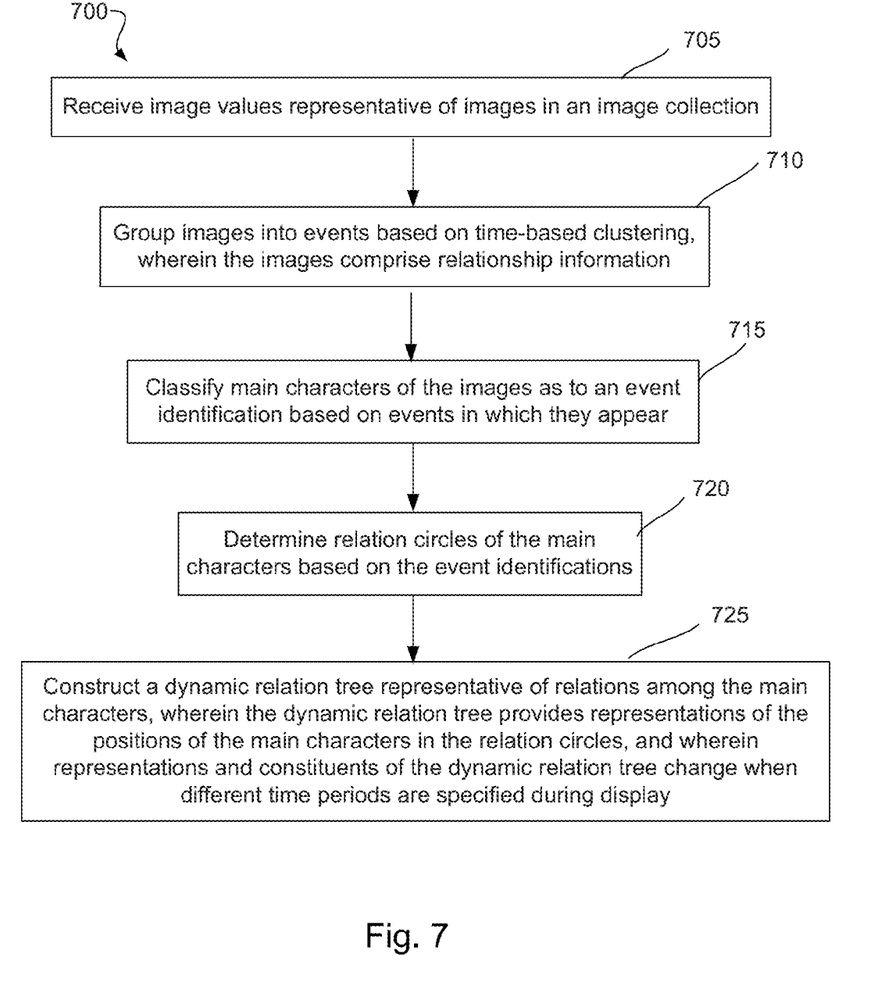
FIG. 7 shows a flow chart of an example process for determining a dynamic relation tree based on images.

FIG. 7 shows a flow chart of an example process 700 for determining a dynamic relation tree based on images in an image collection. The processes of FIG. 7 can be performed as described in connection with FIGS. 2 to 6B. In block 705, image data representative of images from a collection of images is received. In block 710, images are grouped into events based on time-based clustering, where the images comprise relationship information. In block 715, main characters of the images are classified as to an event identification based on events in which they appear. In block 720, relation circles of the main characters are determined based on the event identifications. In block 725, a dynamic relation tree representative of relations among the main characters is constructed. The dynamic relation tree provides representations of the positions of the main characters in the relation circles. Representations and constituents of the dynamic relation tree change when different time periods are specified during display.

In an example, the process includes displaying views of the dynamic relation tree, where the views are navigable by selective zooming to display images associated with certain branches of the dynamic relation tree. In another example, the process includes displaying views of the dynamic relation tree, where the views are navigable by selective zooming to display images associated with a specified time period. In another example, the process includes generating an event-people graph based on the dynamic relation tree, and displaying the event-people graph to a user. In another example, where generating an event-people graph comprises clustering images at fixed times to identify people who appear together in certain events, and estimating the nature and closeness of the relation circles based on the characteristics of the events.

Figure 8:
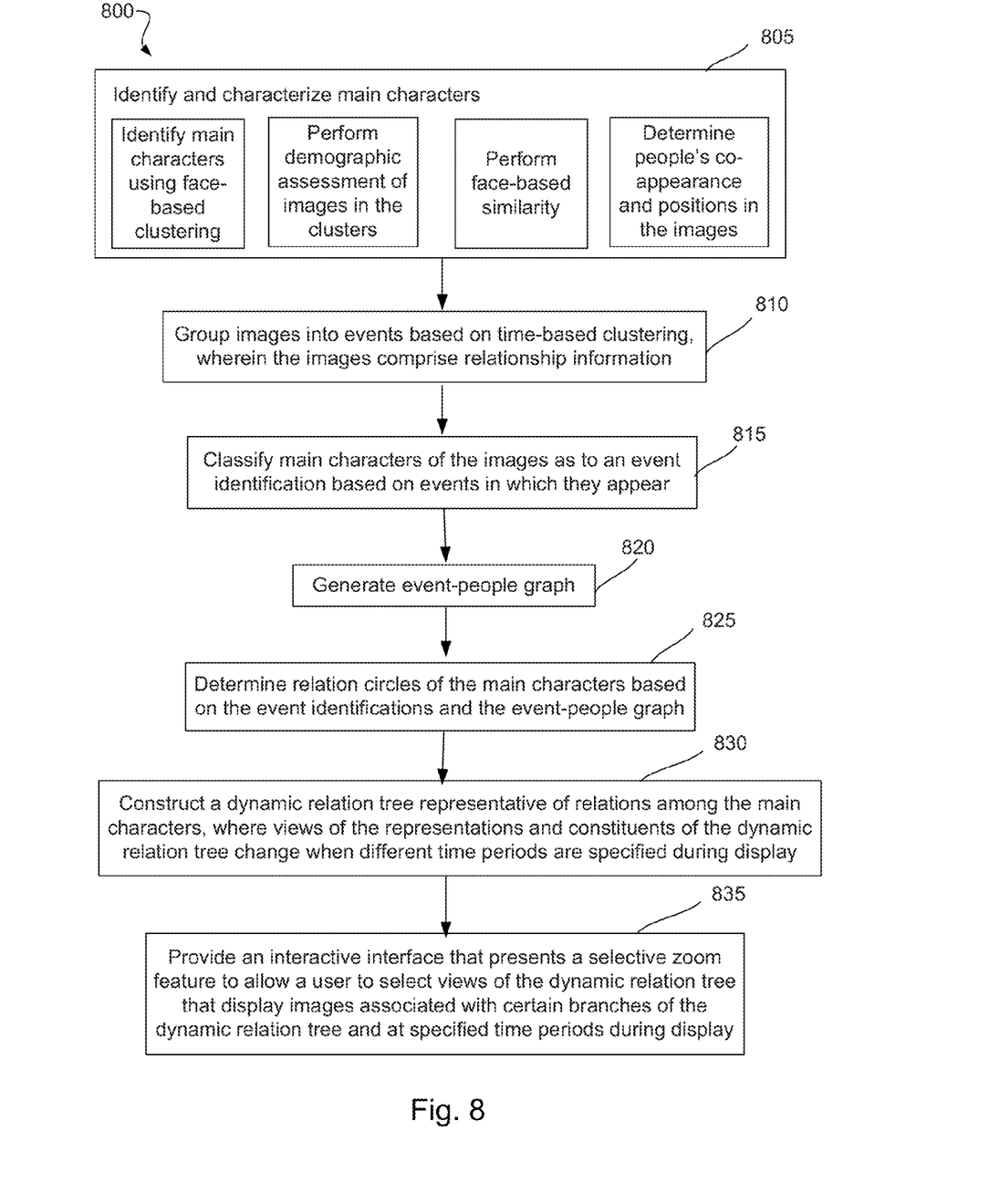
FIG. 8 shows a flow chart of another example process for determining a dynamic relation tree based on images.

FIG. 8 shows a flow chart of an example process 800 for determining a dynamic relation tree based on images in an image collection. The processes of FIG. 8 can be performed as described in connection with FIGS. 2 to 6B. In block 805, main characters from images of an image collection are identified and characterized. In block 810, images are grouped into events based on time-based clustering, where the images comprise relationship information. In block 815, main characters of the images are classified as to an event identification based on events in which they appear. In block 820, an event-people graph is generated. In block 825, relation circles of the main characters are determined based on the event identifications. In block 830, a dynamic relation tree representative of relations among the main characters is constructed, where views of the representations and constituents of the dynamic relation tree change when different time periods are specified during display. In block 825, an interactive interface is provided that presents a selective zoom feature to allow a user to select views of the dynamic relation tree that display images associated with certain branches of the dynamic relation tree and at specified time periods during display.

In an example, the identification and characterization of the main characters includes identifying the main characters using face-based clustering, performing a demographic assessment of the images in the clusters, performing face-based similarity to identify relationships of main characters, and determining the co-appearance and positions of the main characters in the images.

Many modifications and variations of this invention can be made without departing from its spirit and scope, as will be apparent to those skilled in the art. The specific examples described herein are offered by way of example only, and the invention is to be limited only by the terms of the appended dams, along with the full scope of equivalents to which such dams are entitled.

As an illustration of the wide scope of the systems and methods described herein, the systems and methods described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

All references cited herein are incorporated herein by reference in theft entirety and for all purposes to the same extent as if each individual publication or patent or patent application was specifically and individually indicated to be incorporated by reference in its entirety herein for all purposes. Discussion or citation of a reference herein will not be construed as an admission that such reference is prior art to the present invention.

What is claimed is:

1. A system for generating a dynamic representation of relations among individuals, the system comprising:
   a memory for storing computer executable instructions; and
   a processing unit coupled to the memory, operable to execute the computer executable instructions, and based at least in part on the execution of the computer executable instructions operable to perform operations comprising:
      classifying main characters of images in an image collection based on assignments of respective groups of the images in which the main characters appear to respective events, wherein each image has a time stamp, and wherein each main character is characterized by at least one attribute;
      determining relation circles of the main characters based on the event assignments; and
      constructing a dynamic relation tree representative of relations among the main characters, wherein the dynamic relation tree provides representations of the positions of the main characters in the relation circles, and wherein views and constituents of the dynamic relation tree change when different time periods are specified during display.

2. The system of claim 1, further comprising an interactive interface to provide a selective zoom feature that allows a user to select views of the dynamic relation tree that display images associated with certain branches of the dynamic relation tree.

3. The system of claim 1, further comprising an interactive interface to provide a selective time feature that allows a user to select views of the dynamic relation tree that display images of the dynamic relation tree associated with a specified time period.

4. The system of claim 1, wherein based at least in part on the execution of the computer executable instructions the processing unit is operable to perform operations comprising generating an event-people graph based on the assignments of the groups of images to respective events, and displaying the event-people graph.

5. The system of claim 4, wherein, in generating the event-people graph, the processing unit is operable to perform operations comprising: clustering images at fixed times to identify people who appear together in certain events, and estimating the nature and closeness of the relation circles based on the characteristics of the events.

6. The system of claim 1, wherein based at least in part on the execution of the computer executable instructions the processing unit is operable to perform operations comprising:
   applying face clustering to identify face clusters, each face cluster comprising images of a main character;
   determining gender or age group of each main character based on a demographic assessment of each face cluster;
   applying a face similarity measure to identify related persons with similar facial features; and
   extracting co-appearances and relative positions information in the images to determine the closeness of relationship of certain of the main characters.

7. A method performed by a physical computing system including at least one processor for generating a dynamic representation of relations among individuals, comprising:
   grouping images into events based on time-based clustering, wherein the images comprise relationship information;
   classifying main characters of the images as to an event identification based on events in which they appear;
   determining relation circles of the main characters based on the event identifications; and
   constructing a dynamic relation tree representative of relations among the main characters, wherein the dynamic relation tree provides representations of the positions of the main characters in the relation circles, and wherein representations and constituents of the dynamic relation tree change when different time periods are specified during display.

8. The method of claim 7, further comprising displaying views of the dynamic relation tree, wherein the views are navigable by selective zooming to display images associated with certain branches of the dynamic relation tree.

9. The method of claim 7, further comprising displaying views of the dynamic relation tree, wherein the views are navigable by selective zooming to display images associated with a specified time period.

10. The method of claim 7, further comprising generating an event-people graph based on the dynamic relation tree, and displaying the event-people graph to a user.

11. The method of claim 10, wherein generating the event-people graph comprises clustering images at fixed times to identify people who appear together in certain events, and estimating the nature and closeness of the relation circles based on the characteristics of the events.

12. A method performed by a physical computing system including at least one processor for generating a dynamic representation of relations among individuals, comprising:
   identifying and characterizing main characters in images of a collection of images;
   grouping images into events based on time-based clustering, wherein the images comprise relationship information;
   classifying main characters of the images as to an event identification based on events in which they appear;
   generating an event-people graph;
   determining relation circles of the main characters based on the event identifications and the event-people graph;
   constructing a dynamic relation tree representative of relations among the main characters, wherein views of representations and constituents of the dynamic relation tree change when different time periods are specified during display; and
   displaying an interactive interface that presents a selective zoom feature to allow a user to select views of the dynamic relation tree that display images associated with certain branches of the dynamic relation tree and at specified time periods during display.

13. The method of claim 12, wherein identifying and characterizing main characters in the images comprises: identifying the main characters using face-based clustering, performing a demographic assessment of the images in the clusters, performing face-based similarity to identify relationships of main characters, and determining the co-appearance and positions of the main characters in the images.

14. A non-transitory computer-readable storage medium, comprising instructions executable by a processor to:
   group images into events based on time-based clustering, wherein the images comprise relationship information;
   classify main characters of the images as to an event identification based on events in which they appear;
   determine relation circles of the main characters based on the event identifications; and
   construct a dynamic relation tree representative of relations among the main characters, wherein the dynamic relation tree provides representations of the positions of the main characters in the relation circles, and wherein representations and constituents of the dynamic relation tree change when different time periods are specified during display.

15. The non-transitory computer-readable storage medium of claim 14, further comprising instructions executable to display views of the dynamic relation tree, wherein the views are navigable by selective zooming to display images associated with certain branches of the dynamic relation tree.

16. The non-transitory computer-readable storage medium of claim 14, further comprising instructions executable to display views of the dynamic relation tree, wherein the views are navigable by selective zooming to display images associated with a specified time period.

17. The non-transitory computer-readable storage medium of claim 14, further comprising instructions executable to generate an event-people graph based on the dynamic relation tree, and display the event-people graph to a user.

18. The non-transitory computer-readable storage medium of claim 17, wherein the instructions executable to generate the event-people graph comprises instructions executable to cluster images at fixed times to identify people who appear together in certain events, and estimate the nature and closeness of the relation circles based on the characteristics of the events.

19. The non-transitory computer-readable storage medium of claim 14, further comprising instructions executable to characterize each main character as to at least one attribute.

20. The non-transitory computer-readable storage medium of claim 19, comprising executable instructions to:
  apply face clustering to identify face clusters, each face cluster comprising images of a main character;
  determine gender or age group of each main character based on a demographic assessment of each face cluster;
  apply a face similarity measure to identify related persons with similar facial features; and
  extract co-appearances and relative positions information in the images to determine the closeness of relationship of certain of the main characters.

* * * * *